United States Patent
[11] 3,584,955

| | | |
|---|---|---|
| [72] | Inventors | Emile Frans Stievenart<br>Antwerpen;<br>Luc Yves Natens, Berchem; Marcel Nicolas Vrancken, Hove, all of, Belgium |
| [21] | Appl. No. | 738,625 |
| [22] | Filed | June 20, 1968 |
| [45] | Patented | June 15, 1971 |
| [32] | Priority | June 20, 1967 |
| [33] | | Great Britain |
| [31] | | 28.467/67 |

[54] HIGH ENERGY CONTACT PRINTING APPARATUS
11 Claims, 4 Drawing Figs.

[52] U.S. Cl. ................................................ 355/84, 355/91
[51] Int. Cl. ....................................................... G03b 27/10
[50] Field of Search ........................................... 355/84, 85, 86, 87, 91, 92, 94, 99, 78

[56] References Cited
UNITED STATES PATENTS

| 2,740,895 | 4/1956 | Miller .......................... | 355/84X |
| 2,988,979 | 6/1961 | Sigler .......................... | 355/84 |
| 3,428,397 | 2/1969 | Elmer .......................... | 355/11 |

Primary Examiner—Samuel S. Matthews
Assistant Examiner—Richard L. Moses
Attorney—William J. Daniel ABSTRACT: High energy exposure apparatus for copying material of the type developing on exposure to sufficient heat a latent image irreversibly differentiated in a physical property, such as solvent solubility, from the nonimage areas, which apparatus is of the flat bed with an exposure unit travelling between the ends of the bed. A gas discharge tube is provided in the exposure unit which includes shielding means confining the illumination of the tube to only a portion of the length of the bed, and the tube is flashed at consecutive points of its travel in at least one direction over the bed in order to obtain multiple overlapping exposures along the bed. Preferably, the gas discharge tube is flashed in both directions of its travel, the timing of the flashes in one direction being out of phase with the timing of the flashes in the other direction.

PATENTED JUN 15 1971

HIGH ENERGY CONTACT PRINTING APPARATUS

The present invention relates to a photographic printing apparatus for exposing copying material of the type which on brief imagewise exposure to heat exhibits an irreversible differentiation in permeability and/or lyophility and/or solubility and/or meltability.

Copying material of the mentioned kind is known e.g. from our Belgian Patent Specification 681,138 filed May 17, 1966. In said Specification a method for recording information is described which comprises imagewise exposing to heat a copying material incorporating one or more hydrophobic thermoplastic polymers in the form of particles which are in heat-conductive relationship with one or more substances which absorb electromagnetic radiation in the range of said radiation and convert the corresponding part of said radiation into heat, the exposure being of high intensity and short duration so that a record is formed in said material as an irreversible differentiation in physical properties, e,g, in permeability, in lyophility, in solubility, in meltability.

The record in terms of permeability and/or hydrophility and/or solubility and/or meltability can be used in many different ways as is illustrated in the said Specification.

The application of the method of recording described hereinbefore is impeded to some extent by the necessity to effect the imagewise exposure at relatively high energy levels in a very short exposure time, say greater than 0.3 watt.sec. per sq.cm. within 1/500 sec.

Although sources with high radiation intensity and short exposure time, such as Xenon gas discharge lamps, which produce a flash when the charge of a capacitor is electrically discharged through them, are very suited for effecting the exposure, the exposure of areas of, say, 5000 sq.cm. and greater, requires energy quanta of 1500 watt.sec. and higher. In order to provide these energy quanta, a relative expensive electronic arrangement is needed, including a stabilized DC supply of a voltage up to 5000 Volts and a capacitor battery of 100 MFDS or higher. Moreover, the integral exposure of the copying material requires a rather unusual printing arrangement, as used e.g. according to the embodiment described in the Belgian Patent Specification mentioned hereinbefore, comprising a Xenon gas discharge lamp which is in the form of a thin tube and fitted in a hollow glass cylinder around which the recording material and the original are applied in contact with each other.

The object of the present invention, is to provide a printing apparatus for exposing copying material of the type described to an original, wherein the original and the copying material may be positioned in a convenient way, and wherein a flash radiation source of a relatively limited power may be used.

According to the invention a photographic printing apparatus for exposing a copying material, of the type which on brief imagewise exposure to heat exhibits an irreversible differentiation in its physical properties, to an original, comprises a housing, a bed on top of the housing for the location thereon of the original and the copying material, means for putting the copying material in intimate relationship with the original, an elongate gas discharge exposure unit which on ignition produces a high energy radiation flash which illuminates the original over its width but only over part of its length, means for making said exposure unit travel between two terminal positions in a direction substantially normal to the longitudinal axis of the radiation source, flash control means actuated during the travel of the exposure unit for flashing it at consecutive areas, so that overlapping exposure is obtained.

In a preferred embodiment, the apparatus according to the invention comprises reverse control means which is actuated by the exposure unit at its arrival in one terminal position to make it return to the other terminal position, and two groups of flash control means which are actuated by the exposure unit during its travel, one group being operative during the travelling towards one terminal position, the other group being operative during the travelling towards the other terminal position, the distance between the control means of each group being greater than the distance required to expose adjacent areas of the copying material, and the position of the control means of one group being staggered in respect of the other group in the direction of travelling of the exposure unit, so that the exposure unit flashes at different positions according to its direction of travel.

The term "copying relationship" used hereinbefore points to the exposure of the original to the copying material in bodily contact therewith. As the original may be transparent or opaque, the exposure can thus be done by transmission or by reflection.

An embodiment of the invention, selected by way of example, will now be described with reference to the accompanying diagrammatic drawings, in which.

Figure 1:
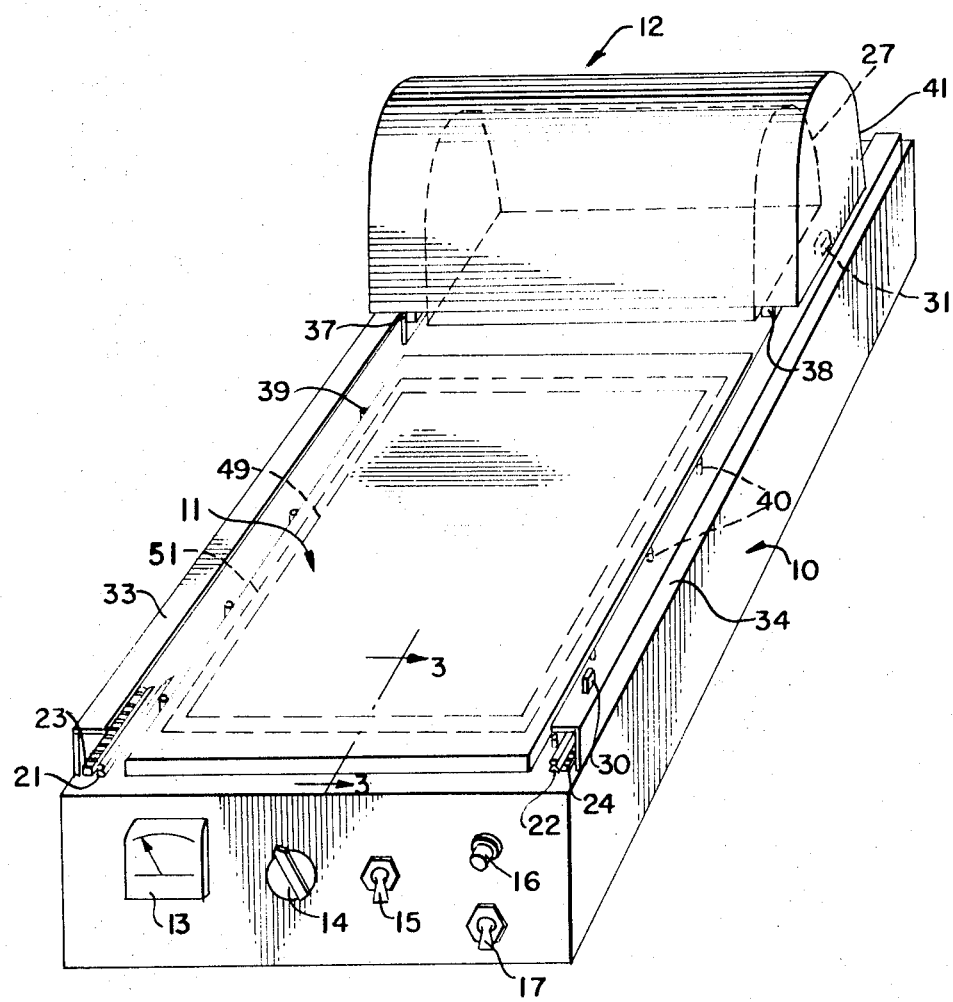
FIG. 1 is a perspective view of the photographic printing apparatus according to the invention.

The printing apparatus shown in FIG. 1, comprises generally the rectangular housing 10 which is provided with a flat vacuum bed 11, and the exposure unit 12 which may travel on the housing between two terminal positions, located at the frontside and the backside of the housing, respectively. The bed extends over only part of the length of the housing, so that the exposure unit in its rest position, as shown, is located completely away from the bed. Within the housing are located the electric supply means, comprising a DC supply for the motor driving the exposure unit, a stabilized high tension DC supply the output voltage of which is adjustable, a capacitor battery which is charged by said high tension DC supply and which is discharged through the Xenon gas discharge tube of the exposure unit 12, and a vacuum pump. Through a flexible lead, not shown, the tension of the two DC supplies are connected to the exposure unit 12. The front side of the housing 10 is provided with a meter 13 on which the high tension of the capacitor battery may be read, a knob 14 for setting the desired high tension, a main switch 15, a pushbutton start switch 16, and a switch 17 controlling the vacuum pump.

Figure 2:
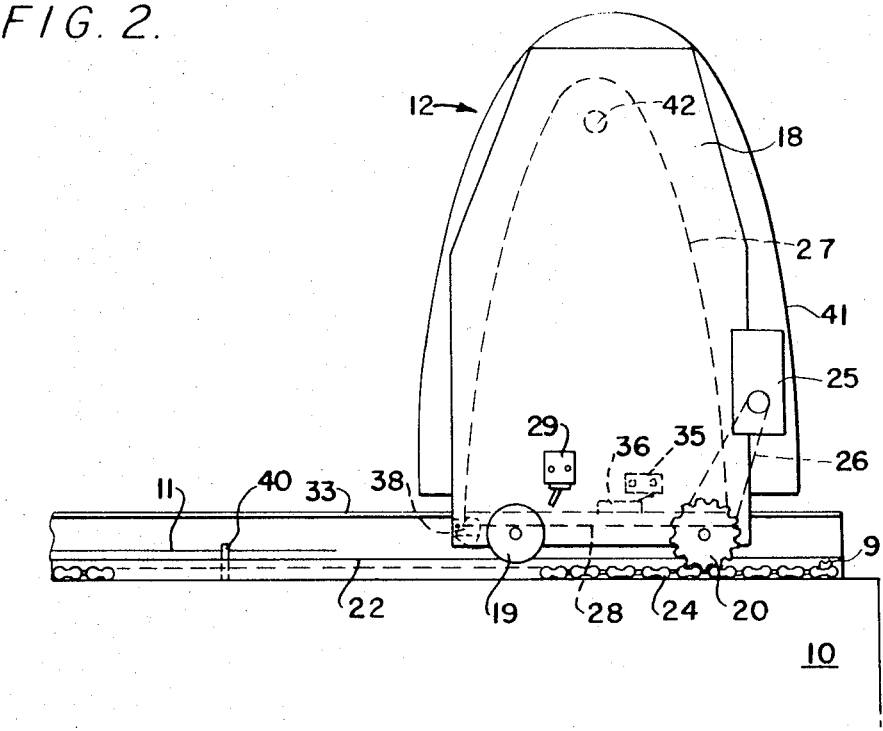
FIG. 2 is a diagrammatic lateral view of the exposure unit.

The exposure unit is shown diagrammatically in FIG. 2. It consists of a carriage supported by two vertical support plates 18 which are transversely spaced by rod means, not shown. At the underside the support plates are provided with two horizontally projecting studs, which rotatably support rollers 19 and sprockets 20. The rollers 19 ride on rails 21 and 22 whereas the sprockets 20 ride on chains 23 and 24 which are provided on top of the housing 10 at either side of the bed 11 and which extend over almost the length of the housing. The chains are tensioned between two terminal fixations, one of them, viz the fixation 9 in the form of a screw, is shown in FIG. 2. For clearness sake, said chains have been shown in FIG. 1 as toothed racks, rather than as the actual chains of FIG. 2. The support plates 18 carry an electric motor 25, the shaft of which extends at either side and is coupled by means of belts 26 to pinions (not shown) which are coaxially and solidly mounted with the sprockets 20. The motor 25 is a DC motor with two field windings, the excitation of one of them causing the motor to rotate in one of both directions.

Between the support plates 18 is located a reflector 27, the longitudinal axis of which extends normal to the direction of travelling of the exposure unit. The reflector is at either side closed. The interior surface of the reflector is pebbled, rippled or deformed in a suchlike way and plated with aluminum or the like, so as to provide a nearly complete but diffuse reflection of light impinging thereon from the source 42. The rim 28 of the rectangular opening of the reflector extends about 4 mm. above the top of the bed 11 when the exposure unit travels on the bed. A Xenon gas discharge tube 42 is provided in the focus of the reflector 27.

The right support plate 18 of the exposure unit, seen according to the view of FIG. 1, is provided with a microswitch 29, the lever of which may be turned over by abutment against projections 30 and 31 on the shield 34. The left support plate 18 is provided with a microswitch 35, the lever of which is actuated when it rides over the projection 36 which is provided on the shield 33.

Further, the support plates 18 are provided with the microswitches 37 and 38 which are actuated when they pass over the four vertical studs 39, respectively over the four studs 40. Said studs are provided at regular intervals at either side of the bed 11, and the studs 40 are staggered in respect of the studs 39.

Finally, the exposure unit 12 is provided with a protective hood 41.

The reason for the provision of the projections controlling the flashing of the exposure unit in two distinct rows which, moreover, are staggered in respect of each other, is the following.

After flashing, the capacitor battery must be recharged. The current to be delivered by the DC high-tension power supply is greater as the time available for the recharging is shorter. In leaving out each time an area of the material during the upgoing movement of the exposure unit, the time available for recharging the capacitor battery is almost doubled. The left out areas are flashed during the returning movement of the exposure unit.

In case the design of the apparatus is different, the overlapping exposures may occur in one direction of travel of the exposure unit. In that case it may be interesting to have the return of the exposure unit effected at increased speed in order to decrease the complete working cycle.

The shields 33 and 34 which are mentioned already hereinbefore, are rectangular profiles which extend over the rails and the chains, and they prevent the exposure unit 12 from accidentally being lifted up from the rails. Accidental removal of the radiation source might cause an incorrect positioning of the radiation source when one sprocket would be shifted over one or more links of the chain in respect of the position of the other sprocket.

Figure 3:
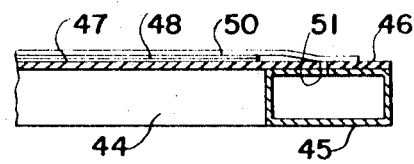
FIG. 3 is a cross section on line 3—3 of FIG. 1, showing an edge portion of the vacuum frame.

Details on the vacuum bed and the positioning of the sheets thereon, are shown in FIG. 3.

The vacuum bed 11 consists of a frame 44, made of rectangular metal tube 45, onto which a flat metal top plate 46 has been soldered. The copying material 47 and a transparent original 48 are placed on the top plate 46, within the confines indicated by the longer broken lines 49 in FIG. 1. A flexible transparent sheet 50, the dimensions of which correspond almost to those of the bed, is placed over said sheets 47 and 48. The annular space within the rectangular tubes 45 is connected through a suction conduit to the vacuum pump located in the housing 10. Through a plurality of bores 51, which are represented in FIG. 1 by the shorter broken lines, the air between the top plate 46 and the sheet 50 is exhausted, so that under atmospheric pressure, the sheet 50 is forcefully pressed down upon the sheets 47 and 48.

Figure 4:
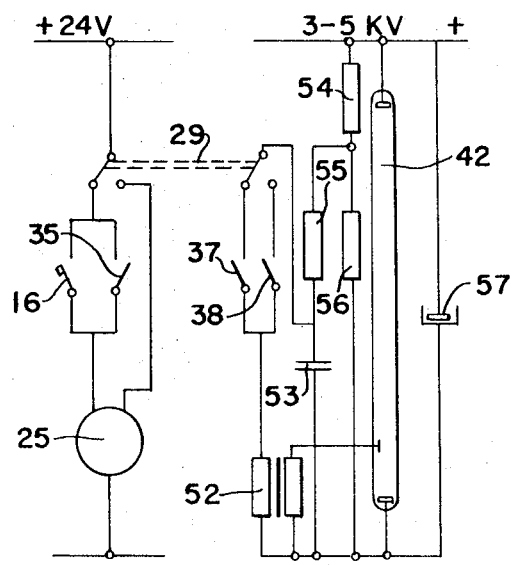
FIG. 4 is a part of the electric circuit of the apparatus.

The part of the electric circuit which is located in the exposure unit 12 and which controls the operation of the apparatus is shown in FIG. 4.

The circuit controlling the driving of the exposure unit comprises one of the two-changeover contacts of microswitch 29, the normally closed contact of the stop microswitch 35, the start contact 16, and the motor 25.

The circuit controlling the ignition of the Xenon gas discharge tube comprises the second changeover contact of microswitch 29, the normally open contacts of microswitches 37 and 38, the ignition transformer 52, the capacitor 53, load resistors 54, 55 and 56. The capacitor battery, represented by capacitor 57, is actually located in the housing 10.

The present printing apparatus showed the following characteristics:
    opening of the exposure unit: 8.5×59 cm.
    length of the bed 11: 66 cm.
    cycle time: 27 seconds
    capacity of battery 57: 60 microfarads
    recharge time of the battery: 2.2 seconds
    DC high tension: adjustable between 3 and 5 KVolts.

In the operation of the apparatus, a copying material was used which was prepared as follows.

A paper support with a weight of 60 g/sq.m and provided with a baryta coating is covered pro rate of 36 g/sq.m with a layer from the following composition:
    10 percent aqueous gelatin    150 g.
    40 percent aqueous emulsion of polyethylene having a particle size of less than
    0.1 $\mu$ and an average molecular weight
    comprised between 15,000 and 30,000    80 q.
    10 percent aqueous dispersion of colloidal
    silver    200 g.
    5 percent aqueous solution of sodium tetradecyl sulfate
    40 g.
    4 percent aqueous formaldehyde    2.5 g.

The layer is dried and the copying material 47 obtained contains a heat-sensitive layer on the paper support. The preparation of the material just described, is found in our Belgian Patent Specification 681,138 filed May 17, 1966, mentioned already in the introduction of the present description.

The apparatus was operated as follows.

The operator closes the main switch 14 and puts the copying material 47 on the bed 11, the heat-sensitive layer turned upwardly. On the copying material a conventional photographic film sheet 48 is located, the developed silver halide emulsion containing a negative screen print of an original being turned downwardly. The transparent sheet 50 is put on top thereof.

The operator closes switch 17 so that the vacuum pump is started, and sheet 50 tightly presses sheet 47 and 48 against the flat bed 11. Occasionally, the operator may strike with his hand over the sheet 50 in order to ensure or to speed up the removal of rests of air, so that sheet 50 becomes perfectly flattened.

Thereafter, the operator actuates pushbutton switch 16 for a few seconds, so that the exposure operation is started. Switch 29 being in the position as shown in the figures, the closing of contact 16 starts motor 25 to rotate and the exposure unit is driven towards the front side of the apparatus, which corresponds to the left hand side according to the view of FIG. 2. After having travelled over about 1 cm., the lever of microswitch 35 is no longer actuated by the projection 36, so that the contact is closed and the motor 25 continues rotating after button 16 is released.

After a few seconds, the lever of microswitch 37 rides over the first of the projections 39, whereby its contact is briefly closed. Thereby capacitor 53, which has been charged through series resistor 55 and through the voltage divider comprising resistors 54 and 56, is discharged through the transformer 52, the secondary of which produces a high tension pulse at the auxiliary electrode of the Xenon gas discharge tube 42. The tube 42 is ignited and the discharging of capacitor battery 57 therethrough causes a high intensity radiation flash of about 1/2000 sec.

The exposure unit 12 continues to advance and when the microswitch 37 is actuated by the next projection 39, the capacitor battery 57 and the capacitor 53 have been recharged so that a new flash is produced.

The distance between the successive notches 39 amounts to about 1.5 times the length of the short side of the rectangular opening of reflector 27, so that successively exposed areas of the copying material are separated by areas which have not been exposed. After four flashes, the exposure unit arrives at its extreme front position, and the lever of microswitch 29 abuts against projection 30 whereby the contacts of the switch are changed over. The motor is energized to rotate in the opposite direction, and the exposure unit travels its way back.

During said travelling in the opposite direction, the microswitch 38 instead of microswitch 37 is connected in the ignition circuit of the Xenon gas discharge tube, so that the projections 40 control the flashing of the exposure unit as it travels back. Since the projections 40 are placed halfway between the projections 39, the flashes produced during the returning movement of the unit expose those areas of the copying material which have not been exposed during the forward movement of the exposure unit as well as the edge portions of the areas already exposed.

In continuing its travel, the exposure unit rides over the projection 36 the actuation of which, however, has no effect since its electrical contact is located in the disconnected branch of changeover contact 29.

Finally, the lever of reverse switch 29 abuts against the projection 31, so that motor 25 starts rotating again in its initial direction until the microswitch 35 is actuated by the projection 36 so that the electric circuit of the motor is opened and the exposure unit comes to arrest.

The operator switches off the vacuum pump so that the imagewise exposed sheet of copying material 48 may be removed and processed.

In the present case, the processing comprises the treatment of the material in a conventional bleaching bath. Only at the areas corresponding with the opaque parts of the negative, silver is bleached out so that a positive print of the photographic negative is obtained. In the print obtained, not any differentiation corresponding with the zones where overlapping exposure occurs, was noted. This phenomenon is to be attributed to the type of copying material for which the printing apparatus according to the invention was developed, and the differentiation in the physical properties of which occurs in a nonadditive way, i.e. two successive exposures, the intensity of each of them being insufficient to cause any differentiation, but the sum of which exceeding the intensity required to cause differentiation, do not cause any differentiation in the physical properties of the copying material.

The example given hereinbefore related to the production of a copy from an original. It is to be understood that the printing apparatus according to the invention may also be used in the production of masters from an original. The following example illustrates said application.

A poly(ethylene terephthalate) support of 0.1 mm. thickness provided with a subbing layer for gelatin is coated with the following composition pro rata of 50 g/sq.m:

10 percent aqueous solution of gelatin having a Bloom gel strength value of 240   450 g.
10 percent aqueous saponin solution   15 g.
10 percent aqueous dispersion of colloidal silver   20 g.

The layer is dried at 20° C. The copying material thus obtained has an optical density of 0.3 measured by transmittance. The preparation of the material just described is found in our Belgian Patent Specification 682,767 filed June 20, 1966.

A graphic original, having radiation absorbing letter markings on a radiation-reflecting background, e.g. a paper support, is put on the bed 11, the markings being turned upwardly, and the copying material is laid thereon, the heat-sensitive layer contacting the original.

After the exposure, the copying material is dipped in water of 20° C. and rubbed gently. The areas corresponding with the white background of the original are washed away, whereas the areas corresponding to the absorbing markings to not dissolve.

The gelatin relief obtained is pressed against the dyestuff layer of a hectographic carbon carrying no hydrophobic surface layer.

After a contact time of about 30 seconds both layers are separated. At the areas corresponding with the letter markings of the original a stratum of the dyestuff layer is transferred to the gelatin relief image, so that a dyestuff containing a laterally reversed relief image of the original is obtained. The mentioned material can be utilized as a spirit duplicating master in a conventional spirit duplicator.

The apparatus according to the invention is not limited to the described embodiment.

The driving of the exposure unit may occur in another way e.g. the motor being located in the housing 10 and driving a cable for pulling the exposure unit either forwardly or backwardly.

The exposure unit may contain more then one flash tube, said other flash tube(s) being preferably mounted parallel to the first tube and in a plane parallel to the bed on which the sheets are located.

The capacity of the capacitor battery 57 and the potential to which it is charged may differ from the values given in the description, but it should be remembered that short discharge times are only obtained for a relatively small capacity value and a relatively high tension.

We claim:

1. High energy exposure apparatus for exposing to an original a copying material of the type which on exposure to a heat image is irreversibly differentiated in its physical properties in the image and nonimage areas, comprising a housing, a bed on top of the housing for the arrangement thereon of the original and the copying material, means for bringing the copying material in intimate relationship with the original, an elongated exposure unit comprising at least one gas discharge tube extending across substantially the entire width of said bed and which on ignition produces a high energy radiation flash and shielding means for limiting the illumination of said tube to only a part of the length of said bed, drive means for making said exposure unit travel between two terminal positions on said bed in a direction substantially normal to the longitudinal axis of the exposure unit, and flash control means actuated during the travel in at least one direction of the exposure unit for flashing said tube at consecutive points between said terminal positions so that multiple exposures of overlapping lengths of said bed are obtained.

2. Photographic printing apparatus according to claim 1, including means at spaced points along said bed for actuating said flash control means during the travel of the exposure unit.

3. Photographic printing apparatus according to claim 1, including means for reversing the direction of travel of said drive means which is actuated by the exposure unit at its arrival in one terminal position to change the course of the exposure unit and to make it return towards the other terminal position.

4. Photographic printing apparatus according to claim 1, wherein said flash control means are provided in two groups, one group being operative during the travelling of the exposure unit towards one terminal position, the other group being operative during the travelling towards the other terminal position.

5. Photographic printing apparatus according to claim 4, wherein the selection between the two groups is controlled by said reverse control means.

6. Photographic printing apparatus according to claim 4, wherein the positions of the flash control means of both groups are staggered in the direction of travelling of the exposure unit so that the exposure unit flashes at different positions according to its direction of travel.

7. Apparatus according to claim 1 wherein said exposure unit comprises an elongate reflector and the gas discharge tube in the focus of said reflector.

8. Apparatus according to claim 7, wherein the inner surface of said reflector is pebbled, rippled or provided with suchlike small surface deformations, which are highly reflective, so that a nearly complete and diffuse reflection of light from the gas discharge tube is obtained.

9. Apparatus according to claim 1, wherein the gas discharge tube is a Xenon gas discharge tube.

10. Apparatus according to claim 1, wherein said exposure unit is mounted on a carriage which is movable in a plane parallel to the bed, and which is self-propelled.

11. Apparatus according to claim 1 wherein said flash control means is operative during the travel of the bed in both directions, the consecutive points at which said tube is actuated while traveling in one direction being out of registration lengthwise of the bed with the consecutive points at which said tube is actuated while traveling in the opposite direction.

UNITED STATES PATENT OFFICE
CERTIFICATE OF CORRECTION

Patent No. 3,584,955        Dated June 15, 1971

Inventor(s) Emile Frans STIEVENART et al

It is certified that error appears in the above-identified patent and that said Letters Patent are hereby corrected as shown below:

In the Heading, insert the following Assignee:

Between [45] and [32] insert :

[73]   Assignee    Gevaert-Agfa, N.V.
                         Mortsel, Belgium

Signed and sealed this 9th day of November 1971.

(SEAL)
Attest:

EDWARD M. FLETCHER, JR.        ROBERT GOTTSCHALK
Attesting Officer                   Acting Commissioner of Patents